US009181726B2

(12) United States Patent
McNeill

(10) Patent No.: US 9,181,726 B2

(45) Date of Patent: Nov. 10, 2015

(54) POST HANDLING DEVICE

(75) Inventor: Peter John McNeill, Masmasters Beach (AU)

(73) Assignee: Peter John McNeill, Masmasters Beach (AU)

( * ) Notice: Subject to any disclaimer, the term of this patent is extended or adjusted under 35 U.S.C. 154(b) by 410 days.

(21) Appl. No.: 13/701,990

(22) PCT Filed: Jun. 9, 2011

(86) PCT No.: PCT/AU2011/000714

§ 371 (c)(1),
(2), (4) Date: Jan. 10, 2013

(87) PCT Pub. No.: WO2011/153589

PCT Pub. Date: Dec. 15, 2011

(65) Prior Publication Data

US 2013/0099184 A1 Apr. 25, 2013

(30) Foreign Application Priority Data

Jun. 9, 2010 (AU) ................................ 2010902540

(51) Int. Cl.

| | |
|---|---|
| ***B66F 3/00*** | (2006.01) |
| ***A01B 1/16*** | (2006.01) |
| ***E04H 17/26*** | (2006.01) |
| *E21B 19/00* | (2006.01) |
| *B66F 15/00* | (2006.01) |

(52) U.S. Cl.

CPC ............ *E04H 17/265* (2013.01); *E04H 17/263* (2013.01); *B66F 15/00* (2013.01); *E21B 19/00* (2013.01)

(58) Field of Classification Search

CPC ..... E04H 17/265; E04H 17/263; E04H 17/26; E04H 17/00

USPC ........ 254/30, 29 R, 129, 131, 132, 120, 93 R, 254/133 R, 31

See application file for complete search history.

(56) References Cited

U.S. PATENT DOCUMENTS

| | | | | | |
|---|---|---|---|---|---|
| 199,904 | A | | 2/1878 | Green | |
| 1,153,024 | A | * | 9/1915 | Brown | 294/104 |
| 1,916,463 | A | * | 7/1933 | Carrel | 254/132 |
| 2,226,456 | A | * | 12/1940 | Westendorf | 254/132 |
| 3,815,875 | A | * | 6/1974 | Koebel, Jr. | 254/132 |

(Continued)

FOREIGN PATENT DOCUMENTS

| | | | |
|---|---|---|---|
| WO | WO2007/022577 | A1 | 3/2007 |
| WO | WO2010/132922 | A1 | 5/2010 |

OTHER PUBLICATIONS

PCT International Preliminary Report on Patentability and Written Opinion mailed May 18, 2012, International Application No. PCT/AU2011/00714, 30 pages.

*Primary Examiner* — Lee D Wilson
*Assistant Examiner* — Seahee Yoon
(74) *Attorney, Agent, or Firm* — Kilpatrick Townsend & Stockton LLP

(57) ABSTRACT

A device for lifting a post out of the ground, including a part for engaging the post and an elongate body having a handle for applying a lever action to the part in order to lift the post from the ground, wherein the part is coupled to a stand and the stand is moveable relative to the body from a stowed condition to a deployed condition whereat the body is pivotally supported above the ground for rotation about the stand in order to effect the lever action.

18 Claims, 5 Drawing Sheets

(56) References Cited

U.S. PATENT DOCUMENTS

| | | | | | |
|---|---|---|---|---|---|
| 3,991,976 | A | * | 11/1976 | Skinner | 254/30 |
| 4,161,310 | A | * | 7/1979 | Parker | 254/30 |
| 4,726,565 | A | * | 2/1988 | Keller | 254/30 |
| 4,738,433 | A | | 4/1988 | Hoff | |
| 5,464,192 | A | * | 11/1995 | Burnham | 254/30 |
| 6,367,779 | B1 | * | 4/2002 | Martin et al. | 254/243 |
| 6,527,250 | B1 | * | 3/2003 | Tyson | 254/30 |
| 8,201,808 | B1 | * | 6/2012 | Busalacchi | 254/132 |
| 2009/0178818 | A1 | * | 7/2009 | McNeill | 254/30 |

* cited by examiner

POST HANDLING DEVICE

FIELD OF THE INVENTION

The invention generally relates to a post handling device for the insertion and removal of posts such as star pickets, T-posts or the like.

BACKGROUND OF THE INVENTION

Post handling devices may be used to both insert and remove a post from the ground. One such example of a post handling device is disclosed in WO2007/022577 which describes a post handling assembly including a main body with an integral post drive means for impacting and driving a post into the ground, and a post extraction means for extracting a post from the ground. The post extraction means including a post grip assembly operatively connected to the main body, the post extraction means being adapted to move between a deployed position and a stowed position within the main body.

To drive a post into the ground the post extraction means is moved to the stowed position and integral post drive means is engaged with the post by inserting the post into a first end of the device. The device is then raised and lowered in a hammer like action to drive the post into the ground.

To remove the post, the post grip assembly is moved to the deployed position. The device is then held with the first end raised and a second end of the device lowered so as to move the post grip assembly into engagement with the post. The second end of the device is provided with integral shoulders adjacent the post grip assembly which in use bear against the ground so as to provide a fulcrum and a base. As such, when a user applies an appropriate force to the first end of the device the device rotates about the shoulders to leverage the post out of the ground.

A disadvantage of this configuration is that the integral shoulders provide only a short distance between the post grip assembly and the ground. As such, the fulcrum point is close to or on the ground and accordingly the rotation of the main body about the fulcrum is limited by the ground surface.

Furthermore, the integral shoulders have a tendency to slide on the ground when in use which may make the removal of a post difficult and/or cause the shoulders to dig into the ground surface. As such, the integral shoulders are difficult to configure so as to provide a large and/or stable base.

A further disadvantage of this configuration is that, in use, there is a relatively large distance between the fulcrum point, where the shoulders engage with the ground, and the post. As such, the post grip assembly needs to be relatively long to extend between the main body and the post. A still further disadvantage of this configuration is that the integral shoulders are not movable relative to the main body.

The invention disclosed herein seeks to ameliorate at least some of these identified disadvantages.

SUMMARY OF THE INVENTION

In a first aspect there is provided a device for lifting a post out of the ground, including a part for engaging the post and an elongate body having a handle for applying a lever action to the part in order to lift the post from the ground, wherein the part is coupled to a stand and the stand is moveable relative to the body from a stowed condition to a deployed condition whereat the body is pivotally supported above the ground for rotation about the stand in order to effect the lever action.

In one form, the stand is connected to a carriage which is slidable lengthwise of the body.

In one form, the stand is formed of a base coupled to the carriage by arms which extend either side of the carriage.

In one form, the part is connected to the carriage by a pivotal linkage which allows articulated movement of the part relative to the stand.

In one form, the part and pivotal linkage are dimensioned to nest between the arms when the stand is in the stowed position.

In one form, the body has a hollow interior arranged to receive the carriage.

In one form, the body has an open end adapted to fit with the base of the stand.

In one form, the carriage is moveable between a first position within the body, when the stand is in the stowed condition, and a second position at the opening, to allow connection of the part to the post, when the stand is in the deployed condition.

In one form, the arms of the stand are external of the body and are connected to the carriage through elongate slots which extend from the open end, lengthwise of the body.

In one form, the elongate body includes external guide tracks arranged either side of the slots, to engage the arms and guide the stand into the stowed condition.

In one form, the device further includes a lock to releasably secure the carriage in the first position within the body.

In one form, the lock is in the form of a clamp to engage with an axle of a pivot connection, which couples the stand to the carriage.

In one form, the device further includes a retainer to releasably secure the carriage in the second position, in which the stand is in the deployed condition, to assist in holding the body on the stand in an elevated position relative to the ground.

In another aspect there is provided, a post handling device including a main body having a handle portion and a support element operatively coupled to the main body, wherein the support element is movable between a stowed position and deployed position in which the support element is extended relative to the body to operatively support the main body above a ground surface.

In one form, the support element includes a stem and a base portion, the stem projecting from the base portion and being pivotally coupled to the main body so as to allow for relative pivotal movement between the main body and the support element when in at least the deployed position.

In one form, the main body is elongate and includes a housing configured to at least partially receive the support element in the stowed position.

In one form, the post handling device further includes a post grip assembly adapted for engaging with a post, the post grip assembly being operatively coupled to at least one of the main body and the support element.

In one form, in the deployed position the support element is configured to operatively support the post grip assembly in a raised position relative to a ground surface.

In one form, the post grip assembly is configured to be at least partially received by at least one of the main body and the support element in a retracted position and is moveable to an extended position so as to be able to engage with the post.

In one form, the post grip assembly is at least partially received by the housing when in the retracted position.

In one form, the housing includes a slot which receives a pin associated with at least one of the support element and post grip assembly, the slot and pin providing a slidable coupling to guide at least one of the support element and post grip assembly between the respective stowed and deployed position and the retracted and extended position.

In one form, the post grip assembly includes a carriage adapted to slide within the housing and a post engaging part pivotally coupled to the carriage.

In one form, the carriage is configured to at least partially resist movement of the support element between the stowed and deployed positions.

In one form, the stem is configured to provide a recess into which at least a portion of the post grip assembly is able to nest when in the retracted position.

In one form, the main body includes a hollow into which a post is able be inserted and a striker plate blinding the hollow for impacting and driving the post into a ground surface.

In still another aspect there is provided, a method of removing a post using the post handling device as described above, the method including the steps of the moving the support element and post grip assembly to the respective deployed and extended positions, placing the base portion onto a ground surface, moving the post grip assembly into engagement with the post and applying a force to the handle portion so to leverage the post out of the ground.

In yet another aspect there is provided, a method of inserting a post using the post handling device as described above, the method including the steps of placing a first end of a post against a ground surface, placing the hollow over a second end of the post so that the post is inserted within the hollow, clasping the handle portion and raising and lowering the device in a hammer like action to drive the post into the ground surface.

BRIEF DESCRIPTION OF THE DRAWINGS

The invention is described, by way of non-limiting example only, by reference to the accompanying drawings, in which.

DETAILED DESCRIPTION OF THE INVENTION

Figure 2:
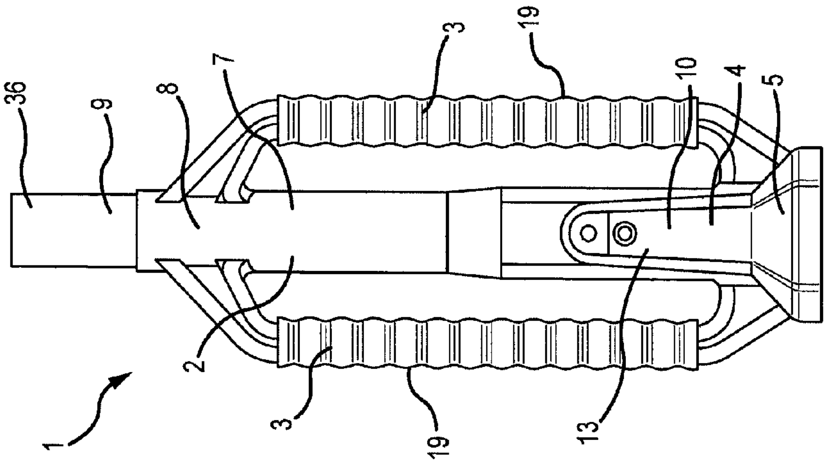
FIG. 2 is a side view illustrating the device with the support element in a stowed position.
Figure 1:
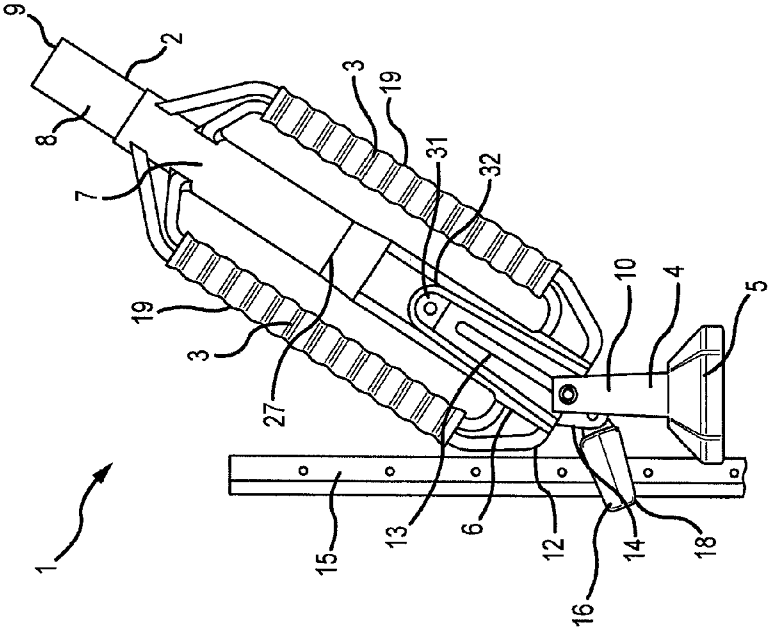
FIG. 1 is a side view illustrating the device with a support element in a deployed position.
Figure 4:
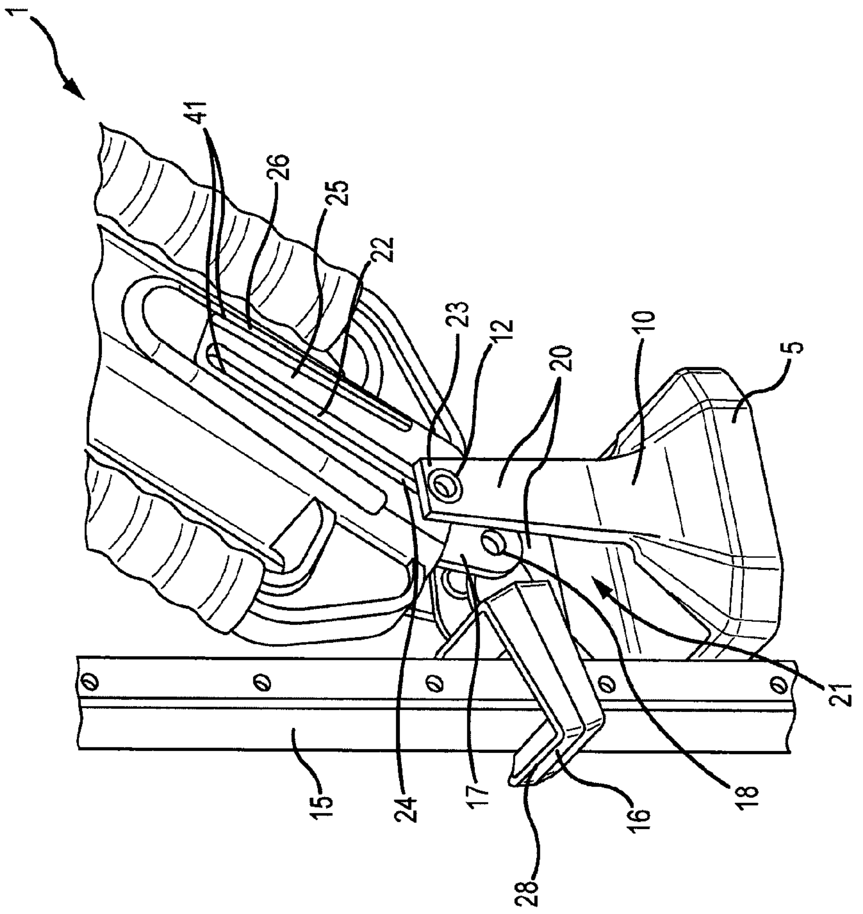
FIG. 4 is a perspective view illustrating the device with the support element in the deployed position and a post grip assembly in an extended position coupled to a post.
Figure 3:
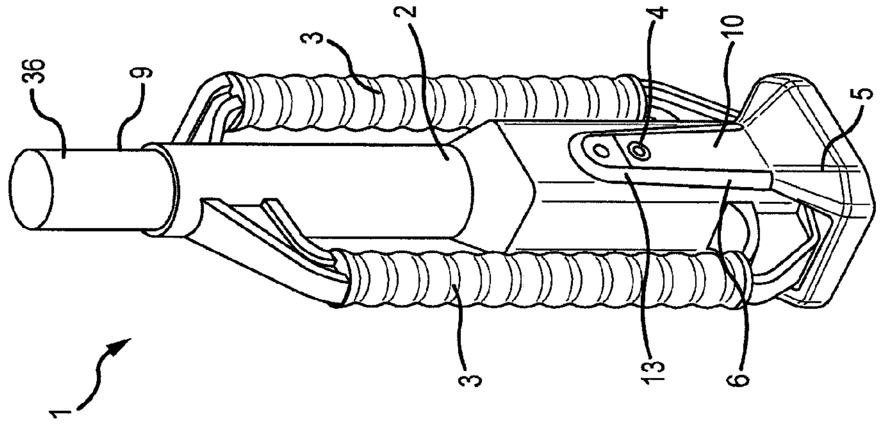
FIG. 3 is a perspective view illustrating the device with the support element in a stowed position.

Referring to FIGS. 1 and 2 there is shown a post handling device 1 for lifting a post 15 out of the ground. The device 1 including a main elongate body 2 with a handle portion 3 adapted to be clasped and a support element or stand 4 operatively coupled to a first end 6 of the body 2. The support element or stand 4 is movable between a stowed condition or position as shown in FIGS. 2 and 3, to a deployed condition or position as shown in FIG. 1, extended relative to the body 2 such that the support element or stand 4 is able to engage with a ground surface to support the main elongate body 2 above the ground surface.

The handle portion 3 includes moulded bars 19 which proceed along each side of a central portion 7 of the elongate body 2. These moulded bars 19 may be formed integrally or otherwise with the central portion 7. Preferably, these moulded bars 19 are formed of a plastics material or other material with low electrical conductivity to assist to prevent possible electric shock or electrocution of a user clasping the bars.

The central portion 7 is formed by moulding, a preferably plastics based material with low electrical conductivity, around an elongate skeleton assembly 27. Preferably, the skeleton assembly 27 is formed of a metal, however it is envisaged other suitable materials could also be used. The central portion 7 includes a housing 13 adjacent the first end 6 and a hollow 8 at a second end 9.

The housing 13 is configured to at least partially the receive the support element or stand 4 in the stowed position as shown in FIG. 2. The support element or stand 4, includes a stem 10 with spaced part arms 20 projecting from a base portion 5 which is adapted to engage with the ground or other suitable surface. The arms of the stem 10 are pivotally coupled by a first pivot 12 to the elongate body 2 so as to allow pivotal movement of the elongate body 2 relative to the support element or stand 4 when in at least the deployed position.

In this example, the base potion 5 is the form of a rectangular plastic footing moulded around a preferably metal frame the upper portion of which provides the stem 10. The sides of the base portion 5 are chamfered inwardly to meet the stem 10, such that when the support element or stand 4 is in the stowed position the base portion 5 resides immediately adjacent the first end 6 of the elongate body 2.

The device 1 further includes a post grip assembly 14 with a post engaging part 16 adapted for engaging with a post 15 and a carriage 17 which is slidably received within the housing 13. The carriage 17 is coupled to the stem 10 at the first pivot 12 and the post engaging part 16 at a second pivot 18. Accordingly, the support element 4 and the post grip assembly 14 are interconnected for operable movement. As such, when the support element 4 is moved to the stowed position the post grip assembly 14 is moved therewith to a retracted position. Similarly, when the support element 4 is moved to the deployed position, the post grip assembly 14 is drawn therewith to an extended position.

Figure 7:
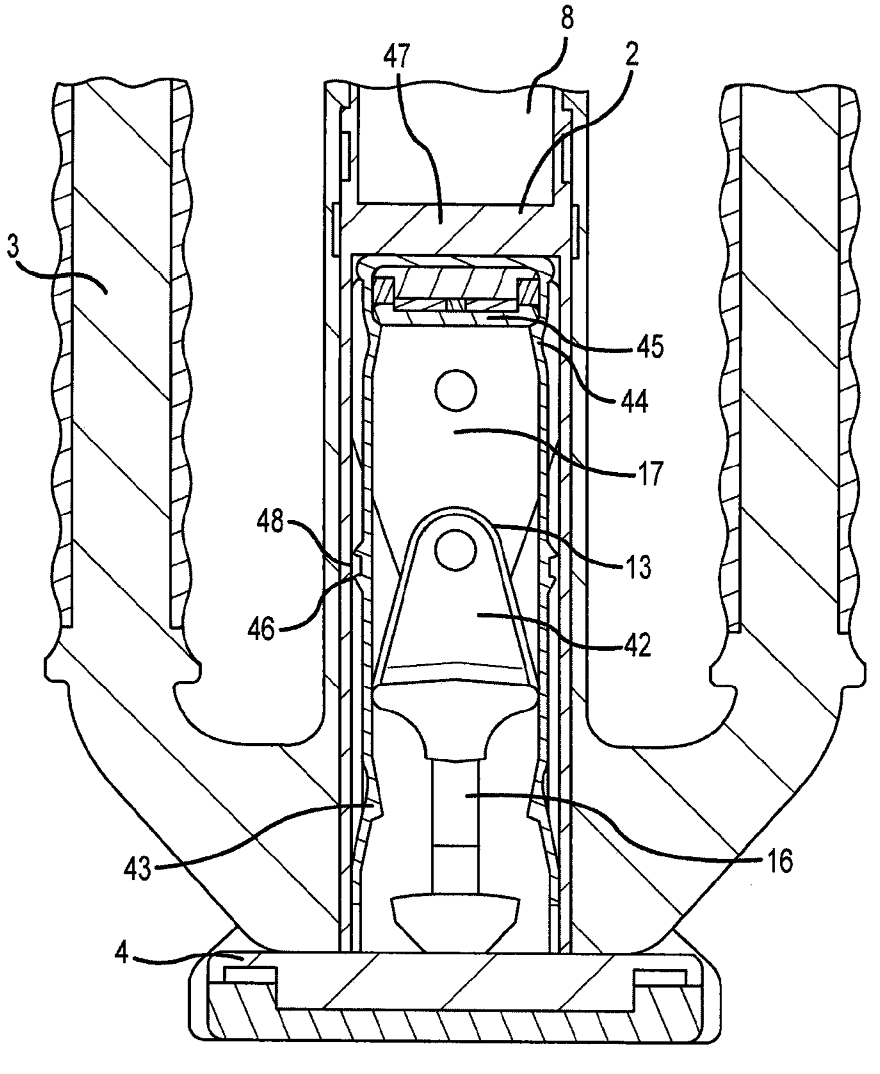
FIG. 7 is a side sectional view of another example of the device including a retaining arrangement fitted to a housing of the device, the support element being retained by the retaining arrangement in the stowed position.

Referring now to FIGS. 1 to 4, the hollow 8 of the central portion 7 includes an open end 36 at the second end 9 into which a post, similar to post 15 is able to be inserted. The central portion 7 includes striker plate 47, as shown in FIG. 7, generally located between the junction of the hollow 8 and the housing 13. Preferably, the striker plate 47 is formed as part of the skeleton assembly 27 to endure, when in use, the repeated impact against the post when driving the post into a ground surface.

The two spaced apart arms 20 of the stem 10 define a recess 21 into which the post grip assembly 14 is able to nest at least when in the retracted position. The housing 13 includes elongate slots 22 on opposing sides which receive a pin 23 of the first pivot point 12. The pin 23 is slidable within the slots 22 to provide a slidable coupling 24 to guide the pin 23 and hence the carriage 17, the support element 4 and the post grip assembly 14 between the stowed and deployed position, in respect of the support element 4, and the retracted and extended position, in respect of the post grip assembly 14.

When moving the support element 4 towards the stowed position the post engaging part 16 may be pivoted about second pivot 18 so as to be received within the recess 21. Accordingly, the support element 4 with the now nested post engaging part 16 may then slide within the coupling 24 to the stowed position.

The arms 20 are laterally spaced apart to receive the housing 13 between the arms 20 and carriage 17. The outside faces 26 of the housing 13 each include two apart elongate ridges 41 which form tracks 25 to guide the spaced apart arms 20 into an alignment suitable for the stowed position. The tracks 25 also prevent the support element 4 from pivoting about the first pivot point 12 when in the stowed position.

Referring to FIG. 3, the post engaging part 16 includes a generally 'U' shaped cross section 28 where the inner surfaces of the cross section 28 are used as the engaging surfaces 29 that engage with the post 15. In use, when the support element 4 is in the deployed position and the post grip assembly is extended, the second pivot 18 facilitates movement between the post engaging part 16 and the elongate body 2, carriage 17 and the support element 4. This relative movement allows the post engaging surfaces 29 to move into frictional engagement with the post 15 so as to grip the post 15. More particularly, the 'U' shaped cross section 28 is able to pivot such that when the elongate body 2 is downwardly actuated the 'U' shaped cross section 28 is rotated such the engaging surface 29 closest to the second pivot 18 moves upwardly in inwardly whist the opposing engaging surface 21 moves downwardly and inwardly. This rotation and movement provides a friction engagement of the opposing engaging surfaces 29 with the post 15 so as to grip the post 15.

In another form, the post engaging part 16 may be adapted to engage with a T-post. For example, the post engaging part 16 may include a horizontal bar that is configured to engage with protruding cleats that are generally present on the vertical sides of a T-post. In other forms, the post engaging part 16 may include movable jaws which are able to clamp onto a post. As such it is envisaged that there are many possible configurations for the post engaging part 16 depending on the size, shape and material of construction of a post.

In the deployed position, first pivot 12 of the support element 4 provides a fulcrum about which the elongate body 2 is downwardly actuated to apply an upward force on the post 15 engaged in use with the post engaging part 16. During this action, the resultant forces between post 15 and the post engaging part 16 will tend to draw the post engaging part outwardly from the housing 13 towards the extended position. However, the upward force applied to the post 15 and the generally downward force applied to the elongate body, will tend to push the support element 4 inwardly into the housing 13 towards the stowed position. Advantageously, as the support element 4 and the post engaging part 16 are both connected to the carriage 17, the inward and outward forces on the support element 4 and the post engaging part 16 are at least partially counter balanced. This assists to maintain the support element 4 in the deployed position and the post grip assembly 14 in the extended position.

Furthermore, when the elongate body 2 is downwardly actuated when removing the post 15, the moment arm between the first pivot 12 and second pivot 18 at least partially contributes to a resultant moment on the carriage 17. As the carriage 17 is retained within the housing 13 this moment or rotation of the carriage 17 is restrained by the housing 13 which results in a frictional engagement of the carriage 17 and the housing 13. This frictional engagement also assists to retain the carriage 17 so the support element 4 is retained in the deployed position and the post grip assembly 14 in the extended position.

Referring to FIGS. 1 to 6, the housing 13 includes a lock provided in the form of a clamp or clip 30 held in place by a pin 31, the clip 30 having a bore 33 through which the pin 31 is received. The pin 31 is secured to the side walls of the housing 13 by corresponding bores 33 on the side walls of the housing 13. The clip 30 has two opposing protruding lips 34 which are biased towards one another so that the clip 30 is able to receive and retain the cylindrical body of the first pivot 12 when the support element 4 is in the stowed position.

Figure 6:
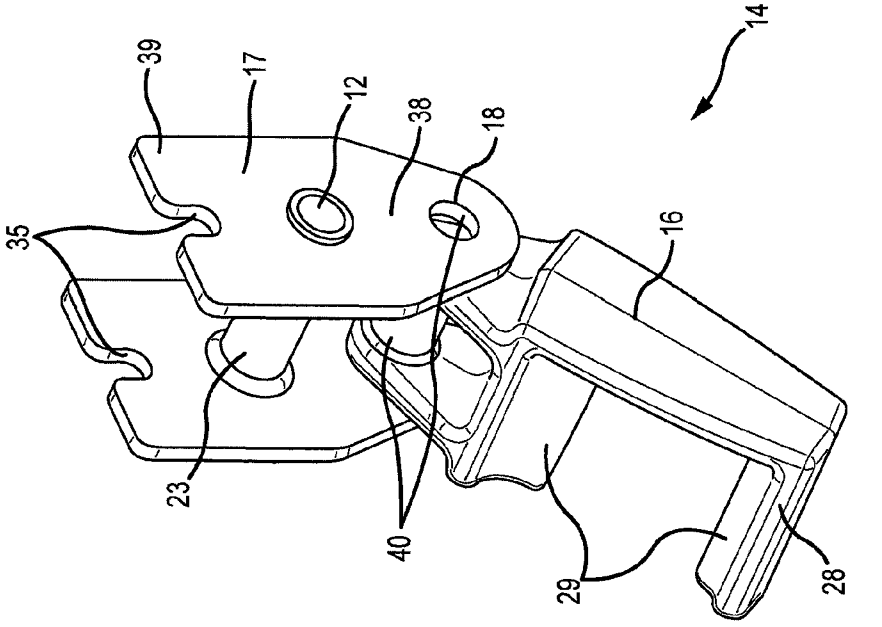
FIG. 6 is a perspective view illustrating the post grip assembly.
Figure 5:
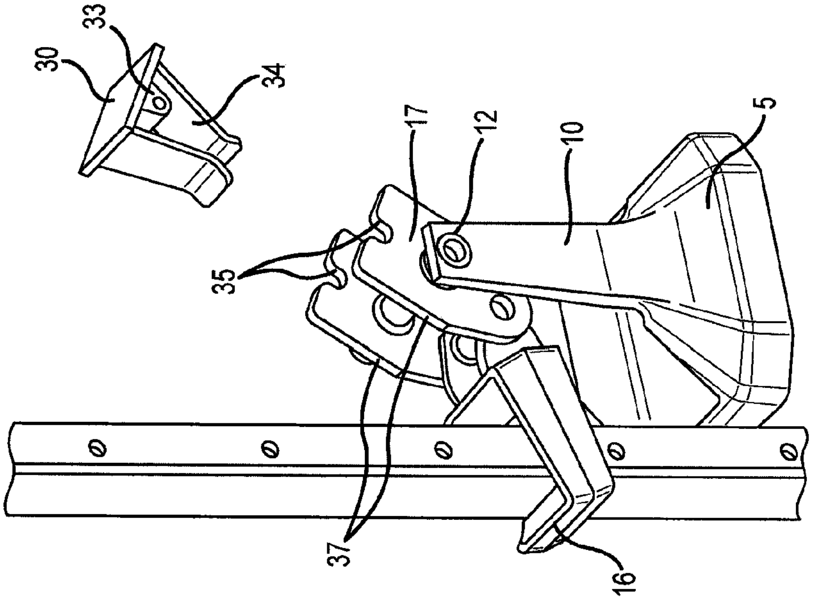
FIG. 5 is an exploded parts view of the support element in the deployed position and the post grip assembly in the extended position coupled to the post.

Referring to FIGS. 5 and 6, the carriage 17 is formed from two spaced apart metal plates 37 which are interconnected by the first pivot 12. The carriage 17 has a first end 38 with corresponding bores 40 to interconnect with and support the second pivot 18 and a second end 39 with cut outs 35. Advantageously, the carriage 17 provides centralised support for both the first pivot 12 and the second pivot 18. This arrangement allows the support element 4, the post engaging part 16 and the elongate body 2 to be able to move relative to one another which has at least the advantages of maneuvering the post engaging part 16 into engagement with the post 15 when in use, and pivoting the post engaging part 16 and the support element 4 into alignment with the housing 13 for movement to the stowed position.

Accordingly, the clip 30 assists to retain the carriage 17 hence the support element 4 in the stowed position. Furthermore, the cut outs 35 are arranged to at least partially receive a pin 31 when in the stowed position to assist to prevent the carriage 17 from movement with the housing 13. Advantageously, the above descried arrangement allows the support element 4 and the post grip assembly 14 to be securely stowed so that the post handling device 1 can also be used as a post driver for impacting and driving a post into the ground.

Figure 8:
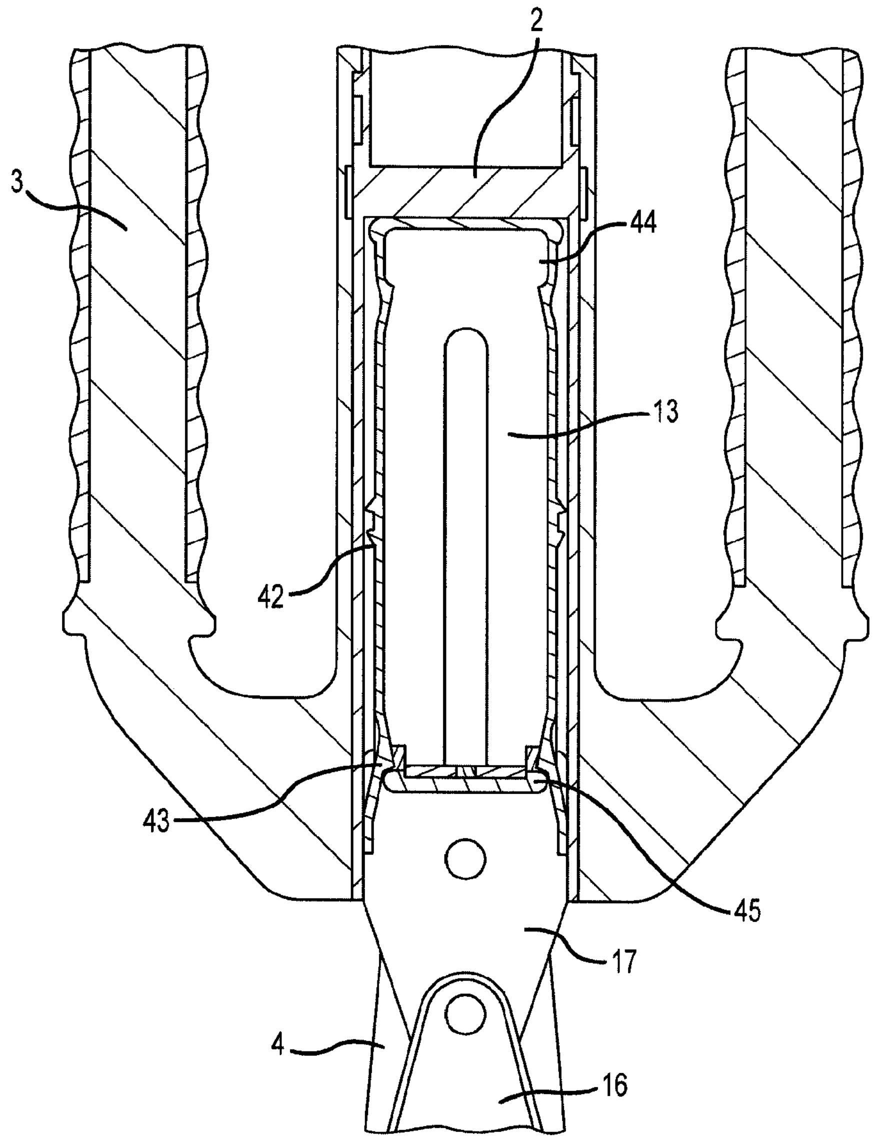
FIG. 8 is a side sectional view of the device shown in FIG. 7 with the support element being retained by retaining arrangement in the deployed position.

Referring FIGS. 7 and 8, there is shown a further example of the device 1 having a retaining arrangement 42 fitted within the housing 13. The retaining arrangement 42 includes protrusions 46 intermediate its ends which receivably engage with corresponding lugs 48 on the walls of the housing 13 to fix the retaining arrangement 42 to the housing 13.

The retaining arrangement 42 includes an outer resilient ramp section 43 and an inner resilient ramp section 44 which each project inwardly of the housing 13 so as to provide a resiliently constricted throat section at each end of the housing 13. These resiliently constricted throat sections provided by the respective ramp sections 43, 44 are sized to retain the carriage 17 of the post grip assembly 14 in extended or retracted positions. Due to the above described coupling between the support element or stand 4 and the carriage 17, the retaining of the carriage 17 in the extended position retains the support element or stand 4 in the deployed position and the retaining of the carriage 17 in the retracted position retains the support element or stand 4 in the stowed position.

More particularly, in this example the carriage 17 includes a flange 45 which when moved over the resilient ramp sections 43 and 44 becomes retained or reversibly locked by the resilient ramp sections 43 and 44 to retain the carriage 17 in either the extended or retracted position. Moreover, each ramp section 43, 44 includes ramps which have a generally saw toothed shape and are arranged in opposing direction to one another so as to allow the carriage 17 to easily proceed from a position between either of the ramp sections 43, 44 and move over a respective one of the ramp sections 43, 44 to become retained by the respective ramp sections 43, 44 in one of the extended or retracted positions.

The generally saw tooth shape of the ramps of the ramp sections 43, 44 assists to retain the carriage 17 in the extended or retracted positions. The ramp sections 43, 44 are sufficiently resilient, for example being formed from a plastic or thin sheet metal, to allow the flange 45 of the carriage 17 to proceed against the saw tooth shape of the ramps, by resiliently flexing the plastic or thin sheet metal, of the ramp sections 43, 44 and accordingly allow the carriage to be moved between the extended or retracted positions and the support element or stand 4 to be moved between the deployed and retracted position.

As may be appreciated from the above, in the example shown in FIGS. 7 and 8, the clip 30 may be replaced by the retaining arrangement 42 which allows the carriage 17 to be retained or locked in extended or retracted position.

In another aspect, a method of using the post removing device as descried above may be as follows. To remove a post, such as post 15, the method preferably includes the steps of the moving support element 4 and the post grip assembly 14 to the respective deployed and extended positions. The base portion 5 is than placed onto a ground surface near to where the post 15 meets the ground surface. The post engaging part 16 of the post grip assembly 14 is then moved into engagement with the post 15 and a generally downward lever force is applied to the handle portion 3 so to leverage to the post 15 out of the ground.

When the post handling device is used to inert a post into the ground, the method of using the device may include the steps of placing a first end of the post 15 against a ground surface, placing the hollow 8 over a second end of the post so that the post 15 is inserted within the hollow 8, clasping the handle portion 3 and raising and lowering the device 1 in a hammer like action to drive the post into the ground surface. When used as a post driver, the support element 4 is moved to the stowed position and accordingly the post grip assembly 14 is in the retracted position.

The above described invention describes an example of a post handling device that may be used for both the insertion and removal of a post. Advantageously, the post handling device 1 is able to be moved between first condition with the supporting element 4 deployed and the post grip assembly 14 extended, where the device 1 can be used to remove a post 15 from the ground, and second condition most suitable for driving a post into the ground where the support element 4 is in a stowed position and the post grip assembly 14 in a retracted position neatly retained at least partially within the housing 13 of the elongate body 13.

In particular, the supporting element or stand 4 is able to support the elongate body 2 in a spaced relation above the ground surface. Advantageously, the supporting element 4 provides an elevated fulcrum point to allow the elongate body 2 to be rotated about the fulcrum point without being restricted by the ground surface. This fulcrum point is able to be placed close to the post in an elevated position so that the post grip assembly 14, in particular, the part of which that protrudes outwardly from the housing 13 is relatively short. Accordingly, due to its relatively short length the post grip assembly 14 is generally subject to relatively low bending forces. Furthermore, due to the shorter length of the post grip assembly 14 relative the elongate body 2 in comparison to known configurations, there is improved mechanical advantage which assists in the removal of posts.

Furthermore, in use, the supporting element or stand 4 provides a stable platform which may assist in the removal of the post by stabilising the device and restricting the uplift of the ground in the vicinity where the post meets the ground surface.

Many modifications will be apparent to those skilled in the art without departing from the scope of the present invention.

The reference in this specification to any prior publication (or information derived from it), onto any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

LIST OF PARTS

1. Post handling device
2. Elongate body
3. Handle portion
4. Support element
5. Base Portion
6. First end
7. Central portion
8. Hollow
9. Second end
10. Stem
12. Pivot
13. Housing
14. Post grip assembly
15. Post
16. Post engaging part
17. Carriage
18. Second pivot
19. Moulded arms
20. Arms
21. Recess
22. Slot
23. Pin
24. Sliding coupled
25. Tracks
26. Outside faces
27. Skeleton assembly
28. U Shaped cross section
29. Post engaging surfaces
30. Clip
31. Pin
32. Bore
33. Bore
34. Lips
35. Cut outs
36. Open end
37. Plates
38. First end
39. Second end
40. Bores
41. Spaced apart ridges
42. Retaining arrangement
43. Outer ramp section
44. Inner ramp section
45. Flange
46. Protrusion
47. Striker plate
48. Lug

The invention claimed is:

1. A device for lifting a post out of the ground, including a part for engaging the post and an elongate body having a handle for applying a lever action to the part in order to lift the post from the ground, wherein the part is coupled to a stand and the stand is moveable relative to the body from a stowed condition to a deployed condition whereat the body is pivotally supported above the ground for rotation about the stand in order to effect the lever action;

wherein the stand is connected to a carriage which is slidable lengthwise of the body;

wherein the stand is formed of a base coupled to the carriage by arms which extend either side of the carriage;

wherein the part is connected to the carriage by a pivotal linkage which allows articulated movement of the part relative to the stand; and wherein the part and the pivotal linkage are dimensioned to nest between the arms when the stand is in the stowed position.

2. The device of claim 1, wherein the body has a hollow interior arranged to receive the carriage.

3. The device of claim 2, wherein the body has an open end adapted to fit with the base of the stand.

4. The device of claim 3, wherein the carriage is moveable between a first position within the body, when the stand is in the stowed condition, and a second position at the opening, to allow connection of the part to the post, when the stand is in the deployed condition.

5. The device of claim 4, wherein the arms of the stand are external of the body and are connected to the carriage through elongate slots which extend from the open end, lengthwise of the body.

6. The device of claim 5, wherein the body includes external guide tracks arranged either side of the slots, to engage the arms and guide the stand into the stowed condition.

7. The device of claim 4, further including a lock to releasably secure the carriage in the first position within the body.

8. The device of claim 7, wherein the lock is in the form of a clamp to engage with an axle of a pivot connection, which couples the stand to the carriage.

9. The device of claim 8, further including a retainer to releasably secure the carriage in the second position, in which the stand is in the deployed condition, to assist in holding the body on the stand in an elevated position relative to the ground.

10. A post handling device including a main body having a handle portion and a support element operatively coupled to the main body, wherein the support element is movable between a stowed position and deployed position in which the support element is extended relative to operatively support the main body above a surface;

wherein the main body is elongate and includes a housing configured to at least partially receive the support element in the stowed position;

further including a post grip assembly adapted for engaging with a post, the post grip assembly being operatively coupled to at least one of the main body and the support element;

wherein in the deployed position the support element is configured to operatively support the post grip assembly in a raised position relative to a ground surface;

wherein the post grip assembly is configured to be at least partially received by at least one of the main body and the support element in a retracted position and is moveable to an extended position so as to be able to engage with the post; and wherein a stem is configured to provide a recess into which the post grip assembly is able to nest at least when in the retracted position.

11. The post handling device of claim 10, wherein the support element includes the stem and a base portion, the stem projecting from the base portion and being pivotally coupled to the main body so as to allow for relative pivotal movement between the main body and the support element when in at least the deployed position.

12. The post handling device of claim 10, wherein the post grip assembly is at least partially received by the housing when in the retracted position.

13. The post handling device of claim 12, wherein the housing includes a slot which receives a pin associated with at least one of the support element and the post grip assembly, the slot and the pin providing a slidable coupling to guide at least one of the support element and the post grip assembly between the respective stowed and deployed position and the retracted and extended position.

14. The post handling device of claim 10, wherein the support element and the post grip assembly are operatively coupled so that movement of at least one of the support element and the post grip assembly causes movement of at least one of the other of the support element and the post grip assembly.

15. The post handling device of claim 14, wherein the post grip assembly includes a carriage adapted to slide within the housing and a post engaging part pivotally coupled to the carriage; and wherein the carriage is configured to at least partially resist movement of the support element between the stowed and deployed positions.

16. The post handling device of claim 10, wherein the body is elongate and includes a hollow into which a post is able to be inserted and a striker plate blinding the hollow for impacting and driving the post into a ground surface.

17. A method of removing a post using the post handling device as described in claim 10, the method including the steps of the moving the support element and the post grip assembly to the respective deployed and extended positions, placing the base portion onto a ground surface, moving the post grip assembly into engagement with the post and applying a force to the handle portion so to leverage the post out of the ground.

18. A method of inserting a post using the post handling device of claim 16, the method including the steps of placing a first end of a post against a ground surface, placing the hollow over a second end of the post so that the post is inserted with the hollow, clasping the handle portion and raising and lowering the device in a hammer like action to drive the post into the ground surface.

* * * * *